United States Patent [19]
Svensson et al.

[11] Patent Number: 5,867,375
[45] Date of Patent: Feb. 2, 1999

[54] SYSTEM FOR REGULATING THE ACTIVE POWER TRANSFERRED INTO AND OUT OF DIRECT VOLTAGE NETWORK BY MULTIPLE POWER STATIONS

[75] Inventors: Kjell Svensson, Ludvika; Rolf Pålsson, Saxdalen, both of Sweden

[73] Assignee: Asea Brown Bovari AB, Vasteras, Sweden

[21] Appl. No.: 950,766

[22] Filed: Oct. 15, 1997

[30] Foreign Application Priority Data

Mar. 24, 1997 [SE] Sweden .................................. 9701064

[51] Int. Cl.$^6$ ...................................................... H02J 3/36
[52] U.S. Cl. .................................. 363/35; 363/65; 307/87
[58] Field of Search ................................ 307/82, 87, 85; 363/35, 65

[56] References Cited

U.S. PATENT DOCUMENTS

| | | | |
|---|---|---|---|
| 4,263,517 | 4/1981 | Konishi | 363/35 |
| 4,648,018 | 3/1987 | Neupauer | 363/35 |
| 4,727,467 | 2/1988 | Bendl et al. | 363/35 |
| 4,941,079 | 7/1990 | Ooi | 363/132 |
| 5,535,113 | 7/1996 | Konishi | 363/35 |

FOREIGN PATENT DOCUMENTS 1033808  6/1978  Canada .

0 047 501 A1  3/1982  European Pat. Off. .

*Primary Examiner*—Peter S. Wong
*Assistant Examiner*—Shawn Riley
*Attorney, Agent, or Firm*—Pollock, Vande Sande & Amernick

[57] ABSTRACT

A system for transmitting power over a direct voltage network. A first power station connects one alternating voltage network to the direct voltage network. The first power station includes a converter for bidirectionally transferring power between the direct voltage network and the alternating voltage network. The converter maintains constant value of voltage on the network, or operates in a second alternative mode of controlling constant current between the alternating voltage network and the direct voltage network. When the voltage on the direct voltage network drops below a reference value, a second power station connected to the direct voltage network and to a remaining alternating voltage network takes over the voltage regulation function. The second power station prior to taking over the voltage regulating friction was in a current regulating function. In this way, when the first station reaches its limits of voltage regulation, the second station is enabled to take over the voltage regulating function switching out of a current regulating function.

13 Claims, 2 Drawing Sheets

SYSTEM FOR REGULATING THE ACTIVE POWER TRANSFERRED INTO AND OUT OF DIRECT VOLTAGE NETWORK BY MULTIPLE POWER STATIONS

BACKGROUND OF THE INVENTION

The present invention relates to a system for transmitting electric power comprising a direct voltage network, and at least two alternating voltage networks which are connected to the direct voltage network through a respective power station. The power stations transfers power between the direct voltage network and the respective alternating voltage network, and has at least one VSC converter to convert direct voltage into alternating voltage, and conversely convert alternating voltage to a direct voltage. An apparatus in a first station controls the converter of the station to regulate the direct voltage of the direct voltage network and maintains the direct voltage at a predetermined nominal value. An apparatus of the other station controls the converter of that station for regulating the current flowing between the respective connected alternating voltage network and its connected station.

Such a system is known through the thesis "PWM and Control of Two and Three Level High Power Voltage Source Converters" by Anders Lindberg, Kungliga Tekniska Högskolan, Stockholm, 1995, which describes a system for transmitting electric power through a direct voltage network for High Voltage Direct Current (HVDC). It is emphasized that the invention is not restricted to this application, but for purposes of illustration the invention will be described with respect to this known system.

Prior to the system described in the thesis, systems for transmitting electric power through a direct voltage network for High Voltage Direct Current have been based upon the use of line-commutated CSC (Current Source Converter) converters in the power stations. The development of IGBTs (Insulated Gate Bipolar Transistor=bipolar transistor having an insulated gate) for high voltage applications which may be easily turned on and turned off simultaneously, has made it possible to create valves for VSC (Voltage Source Converter) converters. VSC converters permit forced commutation as an alternative. This type of power transmission between a direct voltage network for High Voltage Direct Current and alternating voltage networks connected thereto offers several important advantages over the use of the prior art line-commutated CSCs used in HVDC. Th VSC (Voltage Source Converter) permits the consumption of active and reactive power to be controlled independently of each other, and there is no risk of commutation failures in the converter and no corresponding risk of transmitting commutation failures between different HVDC links, which may take place in line-commutated CSC. Furthermore, there is the possibility of feeding power to a weak alternating voltage network or a network which doesn't generate its own power (a "dead" alternating voltage network).

In a system of the type discussed above for HVDC with VSC converters, the direct voltage of the direct voltage network is determined in a first power station, and it is desirable to control the direct voltage level without any rapid telecommunication between a station having voltage-regulating apparatus and the other stations along the direct voltage network. Since each power unbalance results in a change of the direct voltage, which is then corrected by the voltage-regulating station, such a communication possibility will be superfluous. Should the power fed into the network drop as a consequence of limitations in an alternating voltage network for feeding power to a direct voltage network, or in the voltage-regulating station, or should the power fed out of the network exceed the available power fed in, the direct voltage of the direct voltage network will drop. The direct voltage will drop so much that the power fed out is reduced to such a level that power balance is reestablished. This means that the voltage-regulating station has arrived at its regulation limit and cannot maintain the direct voltage at said determined nominal value. This may result in collapse of the direct voltage and temporary disabling of parts of the HVDC system.

SUMMARY OF THE INVENTION

The object of the present invention is to provide a system which solves the problems which arise from differences between the active power fed into the direct voltage network and the active power fed out therefrom.

The object according to the invention is realized by the fact that in such a system the regulating apparatus of the first power station as well as of the other power stations, are adapted to enable regulation of either the voltage or the current of the direct voltage network. The system comprises means connected to each station for measuring the direct voltage on the direct voltage network, and each power station is provided with means to compare the direct voltage measured at the station, with a predetermined value. When the measured voltage is less than the predetermined value, it sends signals to the respective apparatus for changing regulation mode. When the apparatus is incapable of regulating the direct voltage close to the predetermined value, a current-regulating station takes over voltage regulation from the previously voltage-regulating station which in turn becomes current regulating.

Enabling regulation of either voltage or current of the direct voltage network should be interpreted as having regulating apparatus in these power stations which may be in one or the other of these regulation modes at a time. In order to regain power balance upon a power unbalance, any of the stations other than the first voltage-regulating station, has to increase the active power flow towards the direct voltage network, or reduce the tapping of power from the direct voltage network. Since a second station may according to the invention take over the voltage regulation from the first one, and thus enter into so-called back-up voltage-regulating mode, when the direct voltage of the direct voltage network falls below a predetermined value, a further collapse of the direct voltage may be avoided and power balance may be regained.

According to a preferred embodiment of the invention, the respective station comprises members which measure the time during which the direct voltage of the voltage-regulating power station has a value below the predetermined value. The stations are adapted to return to the regulating modes they were in before this reduction in voltage as soon as the reduction in voltage has ceased when the reduction was only a transient reduction in the direct voltage. Thus, the power station which is initially voltage regulating gets the voltage-regulating function back when only transient voltage limitations occur. This is an advantage, since there are usually good reasons for selecting a certain station of the system as a voltage-regulating station, for example when this power station is connected to the most powerful alternating voltage network.

According to another preferred embodiment of the invention the respective station comprises means to measure the time that the direct voltage at the regulating power station has a value below said predetermined value, and the power stations make a change of the regulating mode of the power stations permanent when this time exceeds a certain comparison value. This means that upon a remaining non-transient voltage drop, the voltage-regulating station is permanently changed to another power station, since the regular voltage-regulating station can not overcome its power regulating limitations.

According to a preferred embodiment of the invention, the new power station which is voltage regulating, following a permanent regulating-mode change, assumes the reference voltage of the direct voltage network, which was used by the previously voltage regulating power station. In this way it is ensured that the new voltage-regulating station receives the same target regulation voltage of the direct voltage network as the previously voltage-regulating station had. It is possible that a predetermined direct voltage value of said new power regulating station was lower than said reference value, since it is possible that a lower voltage level is normally allowed at the stations being not voltage regulating than at the voltage-regulating station.

According to another preferred embodiment of the invention the means to compare of the first power station chooses the predetermined voltage level as a value lower than 95% of a nominal value of the direct voltage. This is advantageous, since otherwise a change of voltage-regulating station could occur upon minor variations of the direct voltage which is not required. More particularly, it may be advantageous that the level be within the interval 85–95% of the nominal value. It is important to intervene and change the voltage-regulating station when the direct voltage has fallen so much below the nominal value so as to prevent costly disturbances of the plant.

According to another preferred embodiment of the invention the apparatuses are adapted to have a time of about 0.2 seconds as the comparison value. It has been found that if the voltage remains below the nominal value for more than 0.2 seconds, it is time to permanently change to another voltage regulating station.

According to another preferred embodiment of the invention the system comprises more than two power stations for connecting alternating voltage networks to the direct voltage network, and more than two of the power stations have a regulating apparatus thereof adapted to enable regulation of either voltage or current. It is thus possible to let a suitable station take over the voltage regulation at each separate occurrence of any power unbalance. It is then advantageous for all the power stations to have their regulating apparatus adapted to enable regulation of either voltage or current According to a further development of this embodiment with more than two stations, the different power stations are adapted to change to voltage-regulating mode when different predetermined values of the direct voltage at the respective station are detected. According to another further development of the embodiment having more than two stations, the regulating apparatuses of the different stations permanently change to voltage-regulating mode when the measured voltage falls below the reference values for different durations in time. These embodiments may be customized both with respect to level of voltages for a reference and the time interval of a low voltage condition for changing regulation modes for the different stations i.e. the voltage regulation of the different stations is activated at different reference levels and become permanent when the voltage remains below the respective reference level at different times.

According to still a further preferred embodiment of the invention the system is adapted for transmitting electric power through a direct voltage network for High Voltage Direct Current (HVDC). The advantages of the system according to the invention are particularly apparent in this preferred application.

Further advantages as well as advantageous features of the invention will appear from the following description and the other dependent claims.

DETAILED DESCRIPTION OF THE INVENTION

Figure 1:
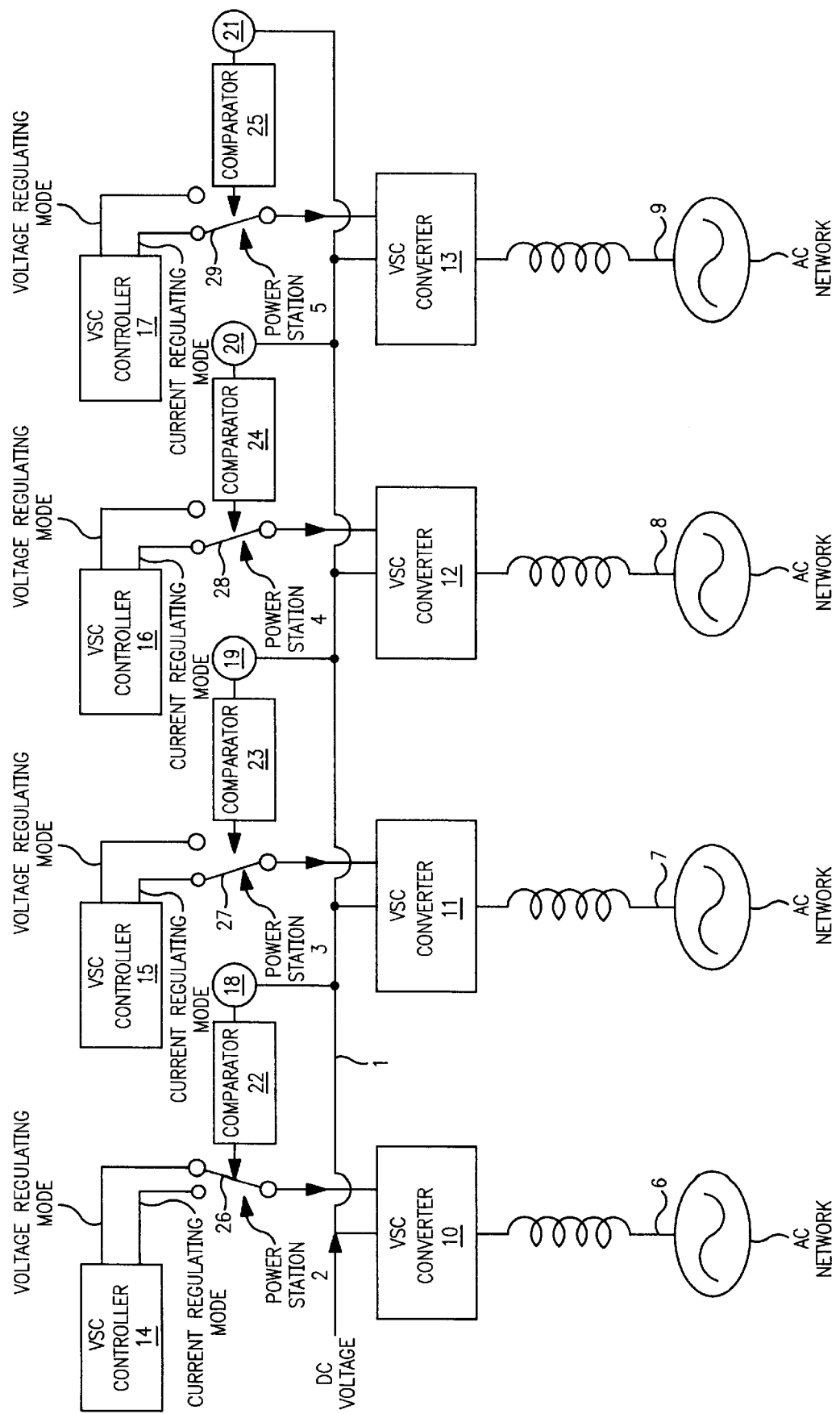
FIG. 1 is a schematic diagram illustrating the principles of the invention.

The system for transmitting electric power according to a preferred embodiment of the invention is schematically illustrated in FIG. 1, in which only the components directly related to the function according to the invention have been shown to facilitate an understanding of the invention. The system comprises a direct voltage network 1 for High Voltage Direct Current (HVDC=High Voltage Direct Current) and in the present case four alternating voltage networks 6–9 connected to the direct voltage network through a respective power station 2–5. The alternating voltage networks are indicated through an alternating voltage symbol and an inductance. The stations are adapted to perform transmission of electric power between the direct voltage network 1 and the respective alternating voltage network in which power may be fed in from an alternating voltage network to the direct voltage network or fed out from the direct voltage network to an alternating voltage network. The alternating voltage networks may accordingly have generators of electric power or only be connected to power consumers thereof. The power stations comprise at least one VSC converter 10–13 adapted to convert direct voltage into alternating voltage and conversely alternating voltage into direct voltage. However, it is possible that each station comprises several such converters, but these are in the present case summarized by a single box for each station. It is also possible that the alternating voltage networks have more than one phase, usually three phases, but the phases of the alternating voltage networks are in the figures summarized through a single line. The respective VSC converter includes conventional valves which are branches of breakers connected in series which can be electronically turned on and off, such as IGBTs, connected to anti-parallel diodes. A large number of IGBTs may be connected in series to form one single valve so as to be turned on and turned off simultaneously to function as one single breaker, and the voltage across the valve is distributed among the different IGBTs connected in series. The control of the breakers takes place in a conventional way by pulse width modulation (PWM).

The power stations further comprise an apparatus schematically indicated as 14–17 for controlling the respective converter 10–13. Each station has means 18–21 connected for measuring the direct voltage, and these means send information about the level of the direct voltage to a member 22–25 to compare the direct voltage thus measured at the station with a predetermined value. The respective apparatus 14–17 is connected to the respective converter 10–13 of the station through a switching member 26–29 which may be influenced between two positions by the comparing member 22–25 so as to transfer the apparatus between a voltage-regulating and a current-regulating mode.

Only station 2 is in a voltage-regulating mode, where switching member 26 is in a different position than the corresponding switching members 27–29 of the other stations which are in the current-regulating mode. The regulation takes place in a conventional way by the way in which the control pulses to the different valves of the converters are designed. The voltage-regulating station 2 attempts to keep the voltage of the direct voltage network at a predetermined nominal value, but it is possible that a power unbalance occurs in the system where the active power fed into the direct voltage network differs from active power fed out of the network. Should the active power fed in fall as a consequence of limitations of the feeding alternating voltage network, or from a limitation of the voltage-regulating station 2, or should power fed out exceed the available over fed in, the direct voltage of the network 1 will fall. The direct voltage will then fall until the power fed out has been reduced to such a level that power balance is there again. Thus, the voltage-regulating station 2 has arrived to the limitation thereof and cannot do anything more to maintain the nominal direct voltage on the direct voltage network. Accordingly, the other stations 3–5 must increase the active power flow towards the direct voltage network, or reduce the tapping of power therefrom so as to attain power balance. In order to obtain this there is in each station a back-up voltage-regulating mode, which is effective when the direct voltage falls below a predetermined level, preferably about 90% of the desired level, and then takes over the direct voltage regulation. This is achieved by the respective comparing members 22–25 which compare the voltage measured by the associated voltage measuring means 18–20 with a predetermined value. When the measured value compares lower than the predetermined reference value, the comparing means sends signals to the respective apparatus, more exactly the switching members 26–29, so as to change the regulation mode. Upon the voltage-regulating apparatus becoming incapable of maintaining the direct voltage close to the nominal predetermined reference value, one of the previously current-regulating stations takes over the voltage regulation from the previously voltage-regulating station, which then becomes current regulating. Accordingly, if the station 3 takes over the voltage regulation, the switching member 27 will turn clockwise, while the switching member 26 turns counterclockwise. In the respective comparing member 22–25, members for measuring the time during which the direct voltage of the station has a value below said predetermined reference value are also included, and in the event of a transient, i.e., a rapidly passing reduction of the direct voltage at the station being voltage regulated, the stations return to the regulation modes they had as soon as the voltage reduction has disappeared. This is desired since there is often a desire to have a certain station as the voltage-regulating station. However, said time measuring members ensure that a permanent change of regulation mode between the stations takes place should the power unbalance problem remain, i.e., should it still be there after a certain time, for example about 0.2 seconds. If such a permanent change takes place the voltage reference of the new voltage-regulating station is increased to said nominal value of the previous voltage regulation station since the voltage reference of this station, with which it is compared in said comparing member, normally is set to a value being lower than said nominal value. Because of the possibility of transferring the voltage regulation to a station which has not reached its regulation limit, a power unbalance may be efficiently corrected.

There is therefore no requirement of any rapid telecommunication between the different power stations thanks to the detecting of the power unbalance by measuring the level of the direct voltage on the direct voltage network at each of the power stations.

It is preferred that only one of the power stations is voltage regulating at a time, while the other stations are current regulating, but in a system having a great number of stations more than one station could be voltage regulating at a time. It is preferred that all the stations have the capability to function both in a current-regulating mode and a voltaic-regulating mode, so that all the stations may function as back-up stations, but it is possible that any or some of the power stations may function only in the current-regulating mode.

Figure 2:
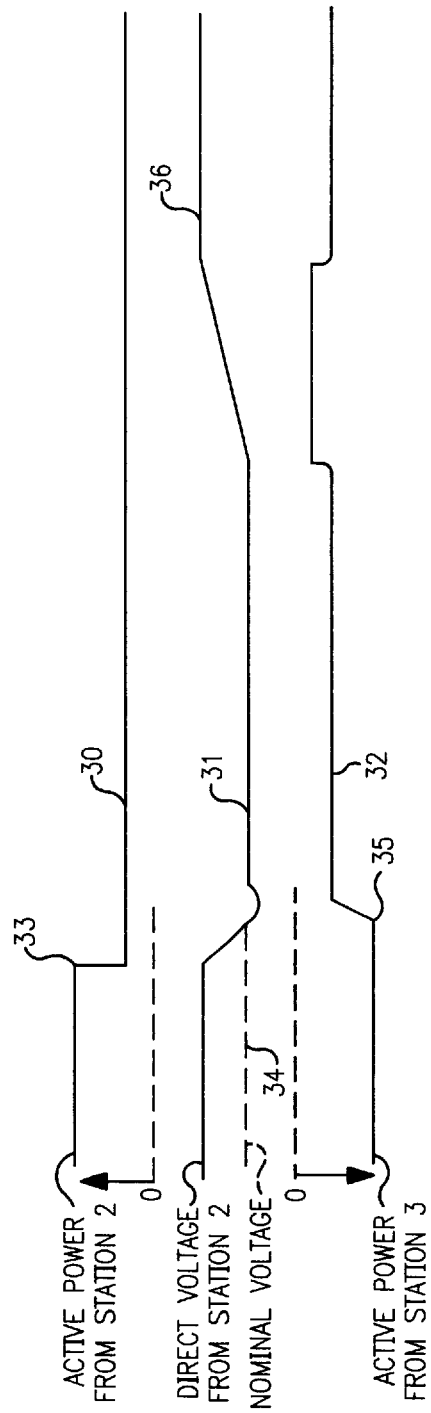
FIG. 2 consists of graphs illustrating the progress of some electric quantities with the time of occurrence of a power unbalance and corresponding change of the voltage-regulating station.

FIG. 2 illustrates with line 30 how the active power is fed out from the voltage-regulating station 2 over time. Lines 31 and 32 show, respectively, the progress of the direct voltage and the active power fed in by the station changing into the voltage-regulating mode. At the time represented by point 33, the voltage-regulating station reaches its limitation and the active power is reduced there, and the direct voltage 31 falls. When the direct voltage has fallen below a predetermined level 34, which is preferably 90% of the previous direct voltage , the other station changes to the voltage-regulating mode, which is indicated by the point 35. Accordingly, the active power being removed from the direct voltage network is reduced at this station to obtain power balance.

The direct voltage has at the point 36 been returned to the nominal value by the new voltage-regulating station.

The invention is of course not in any way restricted to the preferred embodiment described above, but many possibilities of modifications would be apparent to the man skilled in the art without departing from the basic idea of the invention.

Many such alternatives have been mentioned, but it is once again repeated that different direct voltage values may be accepted at different stations, and that the system has components not shown in the drawing, such as for example harmonic filters for removing harmonic currents arising in the pulse width modulation.

Although symbols have been shown in FIG. 1 for certain members, means or the like, it is not necessary that these exist as separate components, but their respective functions may be realized with components performing multiple functions. Some values may for example not be measured directly but calculated from the values of any other quantity measured.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A system for transmitting power comprising:
   a direct voltage network;
   at least two alternating voltage networks;
   a first power station connecting one of said alternating voltage networks to said direct voltage network including:
   (i) a VSC converter for bi-directionally transferring power between said direct voltage network and one of said alternating voltage networks,
   (ii) control means for selectively controlling said VSC converter so that either a constant value of direct voltage is maintained on said direct voltage network, or a constant current is maintained between said alternating voltage network and said direct voltage network,
   (iii) means for comparing the voltage on said direct voltage network with a nominal value, and for controlling said VSC converter to maintain said voltage on said direct voltage network at said nominal value, and
   (iv) means for switching said means for controlling into a current controlling mode if said VSC converter fails to restore said direct voltage network to said nominal value of direct voltage,
   a second power station connecting said direct voltage network to a remaining of said alternating voltage networks including,
   (i) a VSC converter for bi-directionally transferring power between said direct voltage network and said remaining alternating voltage network,
   (ii) means for comparing said direct voltage on said direct voltage network to a nominal voltage value,
   (iii) control means for selectively controlling said second power station VSC converter so that either a constant value of direct voltage is maintained on said direct voltage network, or a constant current is maintained between said direct voltage network and said remaining alternating voltage network; and
   (iv) switching means connected to said means for selectively controlling said second power station VSC converter for switching said VSC converter from a current controlling mode to a voltage controlling mode when said means for comparing indicates that said first power station has failed to maintain said direct voltage at said nominal voltage value.

2. The system according to claim 1 wherein said means for comparing in said first and second power stations initiates switching of said VSC converters from one mode to another when said measured direct voltage is less than said nominal voltage value for a predetermined time interval.

3. The system according to claim 1 further comprising: means at said first station for changing said mode back to a voltage controlling mode, and means at said second station for changing said mode of operation back to a current controlling mode if said direct voltage is reestablished within a predetermined time.

4. The system according to claim 1 wherein said second power station after switching to a voltage controlling mode regulates said direct voltage to equal the nominal voltage previously used by said first station to regulate said direct voltage.

5. The system according to claim 1, wherein the first station nominal voltage value is lower than 95% of a standard value of direct voltage.

6. The system according to claim 5, wherein said first station nominal voltage value is within 85–95% of the standard value of the direct voltage.

7. The system according to claim 2, wherein said predetermined time is longer than 0.15 seconds.

8. The system according to claim 2, wherein said predetermined time is substantially 0.2 seconds.

9. The system according to claim 1 wherein said power stations are configured so that only one is in the voltage regulating mode at one time.

10. The system according to claim 1 further comprising:
    a third power station connected to an additional alternating voltage network and to said direct voltage network comprising:
    converter means for bidirectionally transferring power between said direct voltage network and said additional alternating voltage network,
    means for comparing voltage on said direct voltage network with a reference voltage value,
    means for selectively controlling said converter means so that either a constant value of said voltage on said direct voltage network is maintained or a constant current is maintained between said direct voltage network and said additional alternating voltage network, and
    control means connected to said means for selectively controlling said converter for switching said converter from a current controlling mode to a voltage controlling mode when said direct voltage is less than said reference value.

11. The system according to claim 10 wherein said reference value of said third power station is less than the nominal voltage value of said second power station.

12. The system according to claim 11, wherein said second power station control means connected to said means for selectively controlling said converter switches said converter to a current controlling mode when said third power station switches to a voltage controlling mode.

13. The system according to claim 11, wherein said third power station switches to a voltage regulating mode when said measured direct voltage is less than said nominal voltage for a predetermined time.

* * * * *